United States Patent
Hayes et al.

(10) Patent No.: US 11,254,441 B2
(45) Date of Patent: *Feb. 22, 2022

(54) AIRCRAFT CONTROLLER INCLUDING MULTIPLE CORE PROCESSOR WITH WIRELESS TRANSMISSION PROGNOSTIC/DIAGNOSTIC DATA CAPABILITY

(71) Applicant: Hamilton Sundstrand Corporation, Charlotte, NC (US)

(72) Inventors: Tyler W. Hayes, Rockford, IL (US); Jeffery S. Schmidt, Rockton, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 519 days.

This patent is subject to a terminal disclaimer.

(21) Appl. No.: 16/204,378

(22) Filed: Nov. 29, 2018

(65) Prior Publication Data

US 2020/0172261 A1    Jun. 4, 2020

(51) Int. Cl.
*G06F 15/00* (2006.01)
*B64D 45/00* (2006.01)
(Continued)

(52) U.S. Cl.
CPC ............. *B64D 45/00* (2013.01); *G07C 5/008* (2013.01); *G07C 5/0808* (2013.01); *H04W 4/40* (2018.02); *B64D 2045/0085* (2013.01)

(58) Field of Classification Search
CPC . B64D 45/00; B64D 2045/0085; H04W 4/40; G07C 5/008; G07C 5/0808
(Continued)

(56) References Cited

U.S. PATENT DOCUMENTS

| 7,966,437 B1 | 6/2011 | Spoden |
| 8,229,622 B2 | 7/2012 | Payne et al. |

(Continued)

FOREIGN PATENT DOCUMENTS

DE    102014019531 A1    6/2016

OTHER PUBLICATIONS

Salloum et al. "The ACROSS MPSoC—A New Generation of Multi-core Processors Designed for Safety-Critical Embedded Systems." 2012 15th Euromicro Conference on Digital System Design (Sep. 2012) pp. 105-113.

(Continued)

*Primary Examiner* — Kerri L McNally
*Assistant Examiner* — Thang D Tran
(74) *Attorney, Agent, or Firm* — Cantor Colburn LLP

(57) ABSTRACT

An aircraft includes an electrical system and an electronic controller. The electronic controller includes a main processor and a multi-core processor. The multi-core processor includes a control core in signal communication with the electrical system, and one or more prognostics cores configured to process and analyze prognostics and diagnostics data of the electrical system independently from operation of the control core. A wireless device is in signal communication with one or more of the prognostics cores to receive the prognostics and diagnostics data therefrom. The aircraft further includes a prognostics and health monitoring (PHM) system located remotely from the electronic controller. The PHM system is configured to wirelessly receive the prognostics and diagnostics data from the wireless device.

20 Claims, 2 Drawing Sheets

(51) Int. Cl.
*H04W 4/40* (2018.01)
*G07C 5/00* (2006.01)
*G07C 5/08* (2006.01)

(58) Field of Classification Search
USPC .......................................................... 702/184
See application file for complete search history.

(56) References Cited

U.S. PATENT DOCUMENTS

| | | | | |
|---|---|---|---|---|
| 8,301,867 B1* | 10/2012 | Mazuk | ................ | G06F 11/2005 |
| | | | | 712/36 |
| 8,493,906 B1* | 7/2013 | Troxel | ............... | H04B 7/18506 |
| | | | | 370/316 |
| 9,507,982 B2* | 11/2016 | Mylaraswamy | ... | G06K 7/10366 |
| 2004/0267395 A1* | 12/2004 | Discenzo | ............. | G05B 13/024 |
| | | | | 700/99 |
| 2005/0017876 A1* | 1/2005 | Ziarno | ...................... | F02C 9/00 |
| | | | | 340/945 |
| 2008/0147571 A1* | 6/2008 | Greiner | ............. | G06Q 30/0283 |
| | | | | 705/400 |
| 2008/0161989 A1* | 7/2008 | Breed | ............... | B60R 21/01532 |
| | | | | 701/31.4 |
| 2008/0177436 A1* | 7/2008 | Fortson | .............. | G05B 23/0221 |
| | | | | 701/31.4 |
| 2009/0027229 A1* | 1/2009 | Fortson | .................... | H04Q 9/00 |
| | | | | 340/870.07 |
| 2009/0204245 A1* | 8/2009 | Sustaeta | ................ | H04L 67/125 |
| | | | | 700/99 |
| 2009/0204267 A1* | 8/2009 | Sustaeta | ................ | G06Q 10/04 |
| | | | | 700/291 |
| 2009/0271067 A1* | 10/2009 | Underdal | .............. | G01M 17/00 |
| | | | | 701/33.4 |
| 2010/0076714 A1* | 3/2010 | Discenzo | ............... | H02N 2/185 |
| | | | | 702/104 |
| 2012/0331339 A1* | 12/2012 | Schmidt | .............. | G06F 11/1004 |
| | | | | 714/15 |
| 2014/0303832 A1* | 10/2014 | Skertic | ................... | B64D 45/00 |
| | | | | 701/29.6 |
| 2014/0358362 A1* | 12/2014 | Breed | .................... | G07C 5/008 |
| | | | | 701/31.9 |
| 2015/0266436 A1* | 9/2015 | Erb | ....................... | B63B 45/00 |
| | | | | 340/870.28 |
| 2016/0257415 A1* | 9/2016 | Ye | .......................... | B64D 17/00 |
| 2016/0314631 A1* | 10/2016 | Sobanski | ........... | G05B 23/0208 |
| 2017/0147008 A1* | 5/2017 | Mere | ........................ | G05D 1/00 |
| 2017/0184659 A1* | 6/2017 | Jayawardena | ......... | H05B 45/00 |
| 2017/0184675 A1* | 6/2017 | Freer | .................... | G01R 31/3277 |
| 2017/0259942 A1* | 9/2017 | Ziarno | ................... | G07C 5/085 |
| 2017/0277995 A1* | 9/2017 | Giering | .................. | G06N 3/063 |
| 2018/0288080 A1* | 10/2018 | Keller | ................. | H04L 63/1425 |
| 2019/0090800 A1* | 3/2019 | Bosworth | ............. | B64D 45/00 |
| 2019/0128191 A1* | 5/2019 | Moravek | ................ | F02C 7/275 |
| 2019/0162267 A1* | 5/2019 | Barber | .................. | H05B 6/108 |
| 2019/0180527 A1* | 6/2019 | Segal | ................... | G07C 5/0808 |
| 2020/0045150 A1* | 2/2020 | Lauer | .................. | H04L 65/4069 |
| 2020/0165995 A1* | 5/2020 | Moeckly | ................ | B64F 5/60 |
| 2020/0294401 A1* | 9/2020 | Kerecsen | ............ | G05D 1/0287 |

OTHER PUBLICATIONS

Search Report for European Application No. 19208675.9; Application Filing Date Nov. 12, 2019; dated Apr. 14, 2020 (11 pages).

* cited by examiner

AIRCRAFT CONTROLLER INCLUDING MULTIPLE CORE PROCESSOR WITH WIRELESS TRANSMISSION PROGNOSTIC/DIAGNOSTIC DATA CAPABILITY

BACKGROUND

The teachings described herein relate generally to aircraft systems, and more particularly, to aircraft electronic controllers.

Commercial and military aeronautical applications have individually mounted external accessory components, such as line replaceable units (LRUs), tubes and electrical harnesses, as well as associated mounting brackets, clamps, isolators and bolts. A multiple accessory support bracket is typically employed, which serves to support and mount many or all of the external accessory components, such as the LRUs. The multiple accessory support bracket also facilitates installation of the components onto the accessory support bracket before installation of the accessory support bracket on the LRU. The LRUs typically include an outer housing cover to protect the internal components from damage by surrounding foreign objects.

BRIEF DESCRIPTION

According to a non-limiting embodiment, an aircraft includes an electrical system and an electronic controller. The electronic controller includes a main processor and a multi-core processor. The multi-core processor includes a control core in signal communication with the electrical system, and one or more prognostics cores configured to process and analyze prognostics and diagnostics data of the electrical system independently from operation of the control core. A wireless device is in signal communication with one or more of the prognostics cores to receive the prognostics and diagnostics data therefrom. The aircraft further includes a prognostics and health monitoring (PHM) system located remotely from the electronic controller. The PHM system is configured to wirelessly receive the prognostics and diagnostics data from the wireless device.

According to another non-limiting embodiment, an electronic aircraft controller is configured to control an electrical system of an aircraft. The aircraft controller comprises a multi-core processor including at least one control core and at least one prognostics core. The at least one control core is configured to generate a power control signal to control the electrical system. The at least one prognostics core is configured to process and analyze prognostics and diagnostics data of the electrical system independently from operation of the control core. The at least one prognostics core is further configured to deliver the prognostics and diagnostics data to a wireless device that is configured to wirelessly transmit the prognostics and diagnostics data to a prognostics and health monitoring (PHM) system installed on the aircraft and located remotely from the aircraft controller.

According to yet another non-limiting embodiment, a method is provided to control an electrical system installed in an aircraft. The method comprises outputting, via at least one control core included in a multi-core processor, power signals to operate the electrical system, and returning operating data from the electrical system to the at least one control core. The method further comprises processing, via a prognostics core included in the multi-core processor, the operating data independently from operation of the control core. The method further comprises generating prognostics and diagnostics data of the electrical system based on the operating data independently from operation of the control core, and outputting the prognostics and diagnostics data from the prognostics core to a wireless device. The method further comprises wirelessly transmitting the prognostics and diagnostics data from the wireless device to a prognostics and health monitoring (PHM) system installed on the aircraft and located remotely from the aircraft controller.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
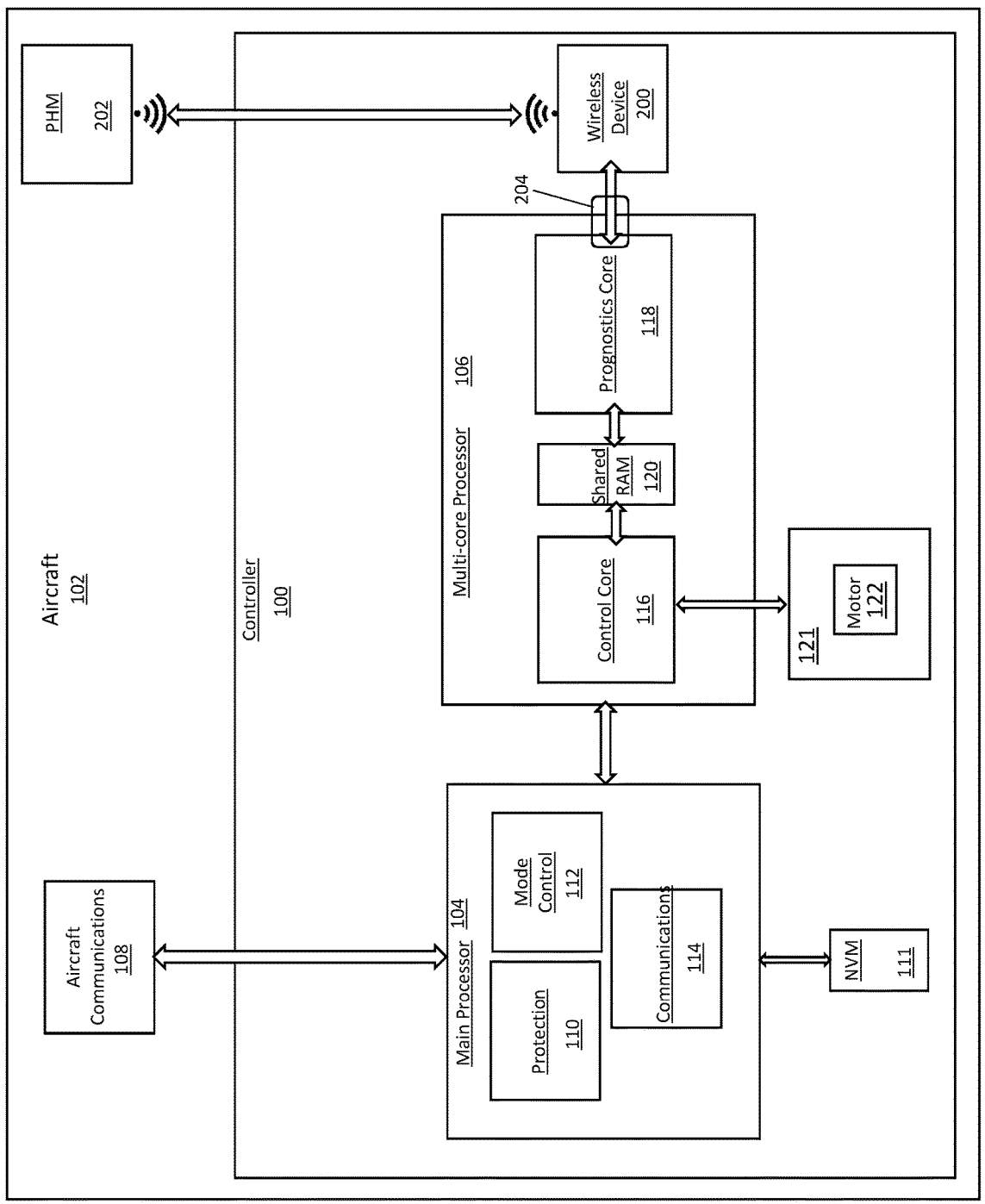
FIG. 1 is a block diagram of an aircraft controller including a multi-core processor and having capability to wirelessly exchange prognostic/diagnostic data to a prognostics and health monitoring (PHM) system according to a non-limiting embodiment.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

As used herein, the term "module" refers to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage unit capable of storing algorithms, logic or computer executable instruction, and that contains the circuitry necessary to interpret and execute instructions.

Turning now to a description of technologies that are more relevant to the present teachings, an aircraft may employ several different LRUs capable of recording operating data and/or fault data of one or more aircraft systems during flight operation. The operating data and/or fault data is typically stored in non-volatile memory (NVM), which can later be retrieved by a service technician. However, the complex housing designs and mounting arrangements of a given LRU make it difficult to obtain the recorded data from the NVM. LRUs are known to include Ethernet ports, which allow data to be downloaded from the NVM. The Ethernet ports, however, are typically encased by the LRU cover and removing the LRU cover to access the Ethernet ports exposes the internal components to a risk of foreign object damage. As a result, the alternative solution to retrieving the recorded operating data is to physically remove the LRU from the aircraft and access the Ethernet ports in a safe and controlled environment, which many times is located offsite from the location of the aircraft.

Various non-limiting embodiments described herein provide an aircraft controller that includes a multi-core processor. The aircraft controller has the capability to wirelessly exchange prognostic/diagnostic data to a prognostics and health monitoring (PHM) system. The multi-core processor includes a lower-level priority prognostic core that is partitioned from a high-level priority control core. The partitioning allows the prognostic core to operate without interrupting operation of the high-level control core. In this manner, the prognostic core can obtain operating data and/or fault data during the flight of the aircraft, process the obtained operating/fault data to generate prognostic and diagnostic data, and transmit the prognostic and diagnostic data during flight to a PHM system installed on the aircraft. Accordingly, the prognostic and diagnostic data is easily obtained during the flight of the aircraft without exposing the internal components of the LRU to foreign object damage, and/or without the need to physically remove the LRU once the aircraft is grounded.

With reference now to FIG. 1, a motor controller 100 installed on an aircraft 102 is illustrated according to a non-limiting embodiment. The motor controller 100 includes a main processor 104 in signal communication with a multi-core processor 106.

The main processor 104 is in signal communication with an aircraft communication system 108 to receive operational commands from the aircraft system. The operation commands include, but are not limited to, motor control commands, software download enable commands, power commands. Electrical operational information such as, for example voltages, current, speed/frequency, protection status from the electrical system 121 can be returned to the aircraft system 102.

The main processor 104 includes a protection unit 110, a mode unit 112, and a communications unit 114. Any one of the protection unit 110, mode unit 112, and communications unit 114 can be constructed as an electronic hardware controller that includes memory and a processor configured to execute algorithms and computer-readable program instructions stored in the memory.

The protection unit 110 is configured to employ various protection measures. The protection measures aim to protect various systems of the aircraft including, but not limited motor system, power generation systems, power distribution system, and motor controller LRUs. Some examples would be over/under/unbalanced current protection, over/under voltage protection, over/under speed protection, over frequency protection, and over temperature protection. The protection operation can include, for example, disconnecting components or shutting down sub-systems when an over/under protection event is detected.

The mode unit 112 is configured to invoke different modes of the electrical system 121. In the example of a motor system, the mode unit 112 can invoke different operating modes of one or more motors 122. In some instances, different motors may operate according to different operational logic and protections. For example, the mode controller 112 can invoke one mode to operate a permanent magnet motor, and another mode to operate an induction motor.

The communications unit 114 is configured to facilitate inter-processor communication on the aircraft 102. In at least one embodiment, the communications unit 114 can facilitate data exchange between the aircraft 102 and the multi-core processor.

The multi-core motor processor 106 includes one or more control cores 116, one or more prognostics cores 118, and one or more shared memory units 120. The control core 116 is in signal communication with an electrical system 121 to control power delivered thereto. The electrical system 121 includes, but is not limited to, a motor system including one or more motors 122, a power generator system, and a power distribution system. The control core 116 and the prognostic core 118 can each be constructed as an independent processing unit referred to as "a core", which is capable of reading and executing program instructions. The program instructions include various central processing unit (CPU) instructions including, but not limited to, add instructions, data move instructions, and branch instructions.

The control core 116 generates controls signals that control operation of a power inverter circuit (not shown), for example, which drives a motor 122. Although one motor 122 is illustrated, the control core 116 and/or power inverter circuit can drive several different motors. The control core 116 can performs the actual control of different motors based on current, voltage, or speed and receives run, stop, and/or protection commands from the main processor 104. In at least one embodiment, the control core(s) 116 and its operations can be assigned a higher priority level than the prognostic core(s) 118.

The prognostics core 118 is configured to generate prognostics and diagnostics data of the electrical system 121, e.g., the motor 122. In one or more embodiments, the electrical system operating data includes, for example, voltage data, current data, load data, torque data, temperature data, and frequency data. Data can be passed from the main processor 104 to the prognostics core 118. Data can also be passed from the control core 116 to the prognostics core 118. The prognostics core 118 is configured to process the obtained data into prognostics and diagnostics data, which has format that can be used by a health management system (not shown).

In at least one embodiment, a non-volatile memory (NVM) unit 111 is provided to store operating data and/or fault data obtained by the main processor 104. In one or more embodiments, the prognostics core 118 is configured to access the NVM 111 directly to obtain the operating data and/or fault data. In other embodiments, the prognostics core 118 can output an NVM data request to the main processor 104. In response to receiving the NVM data request, the main processor 104 can obtain the operating data and/or fault data from the NVM unit 111, and deliver the operating data and/or fault data directly to prognostics core 118. In either case, the prognostic core 118 can then transmit the operating data and/or fault data wirelessly to the PHM 202.

In one or more embodiments, each prognostics core 118 is partitioned (i.e., in space and time) from the control core(s) 116. The partitioning refers to partitioning the prognostics core 118 in space and time from the control core 116. In other words, the prognostics core 118 is partitioned in space such that no other partition can change this partition's memory or affect its allocated time to execute. Accordingly, a separate additional power supply in not required to power the prognostic core(s) 118 thereby avoiding introduction of failure points and power signal noise into the prognostic/diagnostic data signals. The partition also prevents any unintended interactions with the motor control software installed the control core 116. Accordingly, the prognostic core 118 can operate while the aircraft is in-flight to obtain motor operational data and perform prognostic/diagnostic processing and analysis without seizing any cycles from the control core or interrupting the higher priority processing operations (e.g., motor control operations) of the control core 116. For example, the prognostics core 118 will be prevented from operating the motor 122, while the control core 116 can operate entirely independent of the prognostics core 118. In at least one embodiment, the control core 116 is also capable of enabling/disabling the prognostics core 118, while the prognostics core 118 is prevented from interrupting the control core 116 and/or the main processor operation 104

The shared memory unit 120 is in signal communication with both the control core 116 and the prognostics core 118. In one or more embodiments, the control core 116 is configured to obtain operating data during operation of the motor 122 and store the operating data in the shared memory unit 120. The prognostics core 118 is configured to obtain the operating data from the shared memory unit 120, and process and analyze the operating data to perform maintenance and health predictions of the motor 122. In some embodiments, the shared memory unit 120 can be installed externally from both the control core 116 and the prognostics core 118 as illustrated in FIG. 1. In other embodiments, the shared memory unit 120 can be integrated in the control core 116, while still allowing data access to the prognostics core 118. In some embodiments, a plurality of shared memory units 120 can be employed when a plurality of control cores 116 are included in the multi-core processor 106. In this scenario, some shared memory units 120 can be integrated in some control cores 116, while other shared memory units 120 are installed externally from both the control core 116 and the prognostics core 118.

In one or more embodiments described herein, the prognostics core 118 is in signal communication with a wireless device 200 configured to wirelessly exchange data with a prognostics and health monitoring (PHM) system 202 installed on the aircraft 102. Still referring to FIG. 1, the wireless device 200 establishes signal communication with the prognostics core 118 via a wired interface 204. Unlike conventional Ethernet ports which are encased and not accessible without removing the LRU cover (e.g., the cover to controller 100), the wired interface 204 is accessible without requiring removal of the outer cover such that internal components can be protected from foreign object damage.

The wired interface 204 includes, for example, a Universal Serial Bus (USB) interface 204. Accordingly, the wireless device 200 can include a USB connector, which can be connected and disconnected to the interface 204 without removing the controller cover. The operating data and/or fault data from the prognostics core 118 can then be delivered to the wireless device 200, which in turn wirelessly transmits the operating data and/or fault data to the PHM system 202 while the aircraft is in-flight. In this manner, the operating data and/or fault data can be obtained without exposing the internal components of the controller 106 to foreign object damage and/or without requiring physical removal of the controller 106.

The PHM system 202 processes, organizes, and stores the operating data and/or fault data received from the prognostics core 118. Once the aircraft is grounded, the PHM system 202 can wirelessly transmit the stored data to a data processing and analytics system (not shown). The data processing and analytics system can perform advanced analytics such as, for example, artificial intelligence (AI) analysis on the operating data and/or fault data to perform fault diagnosis, root cause predictions, future fault predictions, and resolution measures.

Figure 2:
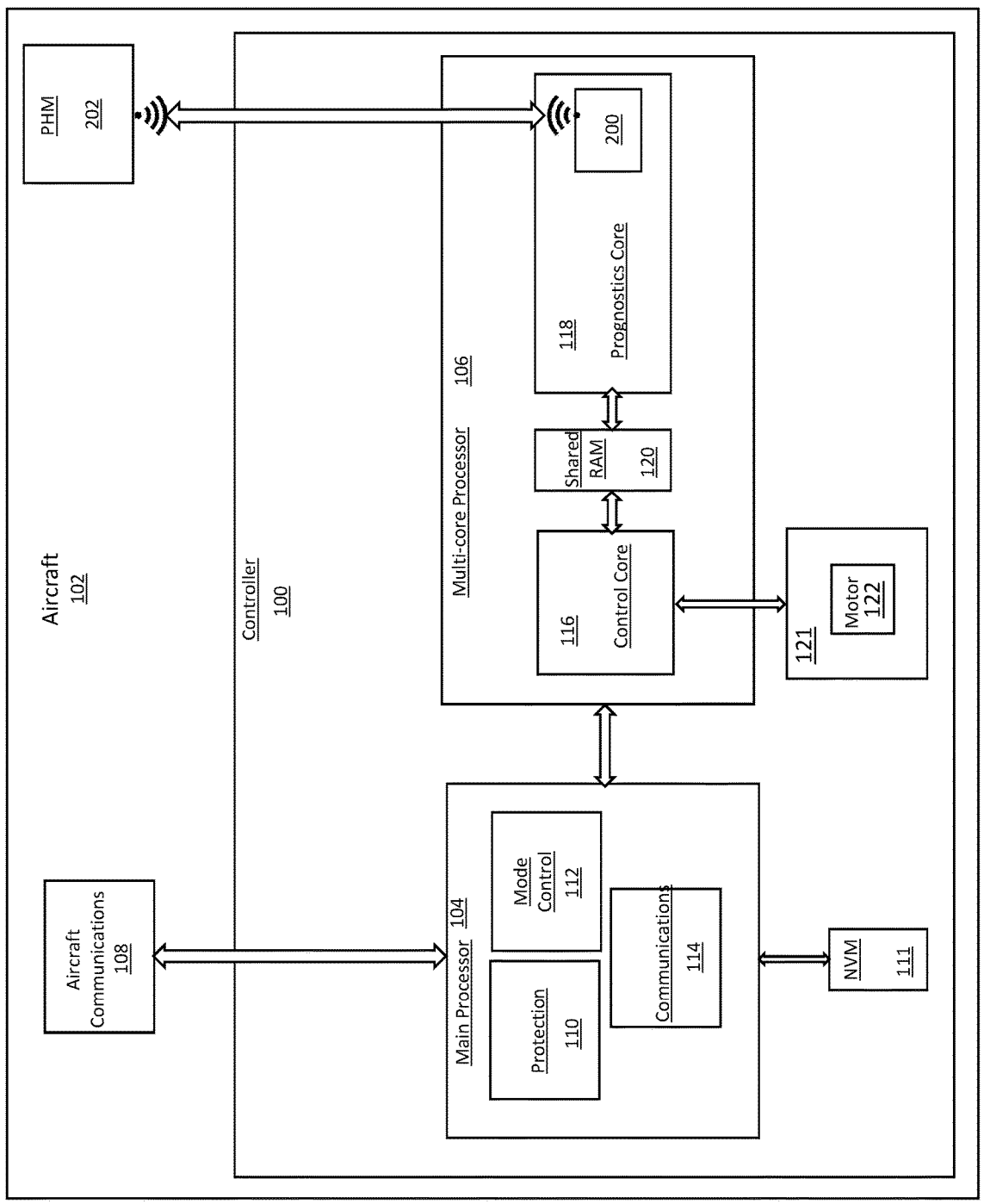
FIG. 2 is a block diagram of an aircraft controller including a multi-core processor and having capability to wirelessly exchange prognostic/diagnostic data to a prognostics and health monitoring (PHM) system according to another non-limiting embodiment.

Turning to FIG. 2, an aircraft controller 100 including a multi-core processor 106 having capability to wirelessly exchange prognostic/diagnostic data to the prognostics and health monitoring PHM system 202 according to another non-limiting embodiment. Rather than employ a wireless interface 204 (see FIG. 1) with the prognostics core 118 to facilitate wireless communication with the PHM system 202, the wireless device 200 is integrated with the prognostic core 118. In one example, the wireless device 200 can be constructed as an integrated chip (IC) that is coupled directly to the prognostic core circuit board. Accordingly, the operating data and/or fault data from the prognostics core 118 can then be output to the wireless device 200, which in turn wirelessly transmits the operating data and/or fault data to the PHM system 202 while the aircraft is in-flight. In this manner, the operating data and/or fault data can be obtained without exposing the internal components of the controller 106 to foreign object damage and/or without requiring physical removal of the controller 106.

As described herein, various embodiments provide a multi-core processor that includes one or more control cores capable of high-priority power control such as, for example, power inversion and motor control, while a separately partitioned prognostics core performs lower-priority prognostic/diagnostic data processing and analysis. The partitioning of the prognostics core prevents any unintended interactions with the control core software, and also avoids cycle usage and interruption of the control core, thereby allowing the prognostics core to operate while the aircraft is operating in-flight.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft comprising:
   an electrical system installed on the aircraft;
   an electronic controller in signal communication with the electrical system, the electronic controller including a main processor and a multi-core processor, the multi-core processor including at least one control core in signal communication with the electrical system to control power delivered thereto, and at least one prognostics core configured to process and analyze prognostics and diagnostics data of the electrical system independently from operation of the control core;

a wireless device in signal communication with the at least one prognostics core to receive the prognostics and diagnostics data therefrom; and a prognostics and health monitoring (PHM) system located remotely from the electronic controller, the PHM system configured to wirelessly receive the prognostics and diagnostics data, wherein the at least one control core and its control of power delivery to the electrical system is assigned a higher priority level than the at least one prognostics core and its operation to process and analyze the prognostics and diagnostics data of the electrical system, and wherein the at least one control core is configured to enable and disable the at least one prognostics core, while the at least one prognostics core is prevented from interrupting one or both of the at least one control core and the main processor.

2. The aircraft of claim 1, wherein the at least one prognostics core includes a wired interface configured to establish a wired connection between the wireless device and the at least one prognostics core.

3. The aircraft of claim 2, wherein the wireless device is located externally from the electronic controller, and includes a wired connector configured to facilitate and connection and disconnection with the at least one prognostics core.

4. The aircraft of claim 1, wherein a wired device is integrated with the at least one prognostics core.

5. The aircraft of claim 1, wherein the at least one prognostics core is partitioned from the at least one control core and performs processing and analysis of the prognostics and diagnostics data without using processing cycles of the control core.

6. The aircraft of claim 5, wherein the electronic controller further includes a shared memory unit in signal communication with the at least one control core and the at least one prognostics core.

7. The aircraft of claim 6, wherein the at least one control core is configured to store operating data obtained during operation of the electrical system in the shared memory unit, and the at least one prognostics core is configured to obtain the operating data from the shared memory unit, and process and analyze the operating data to perform maintenance and health predictions of the electrical system.

8. The aircraft of claim 1, wherein the at least one prognostics core performs the processing and analysis of the prognostics and diagnostics data during in-flight operation of the aircraft.

9. The aircraft of claim 1, wherein the electrical system is a motor system including at least one motor.

10. The aircraft of claim 1, wherein the electrical system includes at least one of a power distribution system and a power generator system.

11. An electronic aircraft controller configured to control an electrical system of an aircraft, the aircraft controller comprising:

a multicore processor comprising:

at least one control core configured to generate a power control signal to control the electrical system;

at least one prognostics core configured to process and analyze prognostics and diagnostics data of the electrical system independently from operation of the control core, wherein the at least one prognostics core is configured to deliver the prognostics and diagnostics data to a wireless device that is configured to wirelessly transmit the prognostics and diagnostics data to a prognostics and health monitoring (PHM) system installed on the aircraft and located remotely from the aircraft controller, wherein the at least one control core and its control of power delivery to the electrical system is assigned a higher priority level than the at least one prognostics core and its operation to process and analyze the prognostics and diagnostics data of the electrical system, and wherein the at least one control core is configured to enable and disable the at least one prognostics core, while the at least one prognostics core is prevented from interrupting one or both of the at least one control core and the main processor.

12. The aircraft controller of claim 11, wherein the at least one prognostics core includes a wired interface configured to establish a wired connection between the wireless device and the at least one prognostics core.

13. The aircraft controller of claim 12, wherein the wired interface is configured to facilitate connection and disconnection between the at least one prognostics core and a wired device.

14. The aircraft controller of claim 13, wherein the wired device is integrated with the at least one prognostics core.

15. The aircraft controller of claim 11, wherein the at least one prognostics core is partitioned from the at least one control core and performs processing and analysis of the prognostics and diagnostics data without using processing cycles of the control core.

16. The aircraft controller of claim 15, wherein the at least one prognostics core performs the processing and analysis of the prognostics and diagnostics data during in-flight operation of the aircraft.

17. A method of controlling an electrical system installed in an aircraft, the method comprising:

outputting, via at least one control core included in a multi-core processor, power signals to operate the electrical system;

returning operating data from the electrical system to the at least one control core;

processing, via a prognostics core included in the multi-core processor, the operating data independently from operation of the control core;

generating prognostics and diagnostics data of the electrical system based on the operating data independently from operation of the control core;

assigning a first priority to the operation of outputting, via at least one control core, the power signals to operate the electrical system that is a higher priority than a second priority assigned to the operation of processing the operating data, via the prognostics core, such that the at least one core processor is configured to enable and disable the prognostics core while the prognostics core is prevented from interrupting one or both of the at least one control core and the main processor;

outputting the prognostics and diagnostics data from the prognostics core to a wireless device; and wirelessly transmitting the prognostics and diagnostics data from the wireless device to a prognostics and health monitoring (PHM) system installed on the aircraft and located remotely from the aircraft controller.

18. The method of claim 17, where outputting the prognostics and diagnostics data comprises:
establishing a wired connection between the at least one prognostics core and the wireless device located externally from the multi-core processor; and
delivering the prognostics and diagnostics data to the wireless device via the wired connection.

19. The method of claim 17, wherein wireless transmitting the prognostics and diagnostics data comprises:
integrating a wired device with the at least one prognostics core; and
wirelessly transmitting the prognostics and diagnostics data from the wireless device directly to the PHM system.

20. The method of claim 17, further comprising:
partitioning the at least one prognostics core from the at least one control core; and
processing, via the at least one prognostics core, the operating data during in-flight operation of the aircraft to generate the prognostics and diagnostics; and
wirelessly transmitting the prognostics and diagnostics from the wireless device to the PHM system during in-flight operation of the aircraft.

* * * * *